(12) United States Patent
Wedding et al.

(10) Patent No.: US 9,314,996 B1
(45) Date of Patent: *Apr. 19, 2016

(54) METAL FOAM CONTAINING HOLLOW SHELLS AND METHODS OF PREPARATION

(76) Inventors: Carol Ann Wedding, Toledo, OH (US); Oliver M. Strbik, III, Holland, OH (US); Todd Osborn, Northwood, OH (US)

(*) Notice: Subject to any disclaimer, the term of this patent is extended or adjusted under 35 U.S.C. 154(b) by 817 days.

This patent is subject to a terminal disclaimer.

(21) Appl. No.: 13/153,849

(22) Filed: Jun. 6, 2011

Related U.S. Application Data

(60) Provisional application No. 61/351,823, filed on Jun. 4, 2010.

(51) Int. Cl.
   *B32B 5/18* (2006.01)
   *B32B 15/01* (2006.01)

(52) U.S. Cl.
   CPC ............ *B32B 15/01* (2013.01); *B32B 2305/028* (2013.01)

(58) Field of Classification Search
   None
   See application file for complete search history.

(56) References Cited

U.S. PATENT DOCUMENTS

| | | | | |
|---|---|---|---|---|
| 3,781,170 A * | 12/1973 | Nakao et al. | ..................... | 75/232 |
| 4,568,389 A * | 2/1986 | Torobin | ........................ | 75/229 |
| 4,775,598 A * | 10/1988 | Jaeckel | ........................ | 428/550 |
| 4,925,740 A * | 5/1990 | Norris et al. | ................. | 428/547 |
| 7,641,984 B2 * | 1/2010 | Rabiei | ............................ | 428/613 |
| 8,815,408 B1 * | 8/2014 | Cochran et al. | .............. | 428/613 |
| 2003/0104147 A1 * | 6/2003 | Bretschneider et al. | ..... | 428/34.7 |
| 2006/0140813 A1 * | 6/2006 | Rabiei | ............................ | 419/2 |
| 2006/0222844 A1 * | 10/2006 | Stinson | ........................ | 428/323 |
| 2011/0020630 A1 * | 1/2011 | Gladysz et al. | ............ | 428/304.4 |

OTHER PUBLICATIONS

Sugimura, Y. et al. "On the mechanical performance of closed cell Al alloy foams," 1997, Acta Mater. vol. 45, pp. 5245-5259.*

* cited by examiner

*Primary Examiner* — Humera Sheikh
*Assistant Examiner* — Seth Dumbris
(74) *Attorney, Agent, or Firm* — Donald K. Wedding

(57) ABSTRACT

Syntactic foam composite comprising hollow metallic shells and a solid metal matrix. The foam composite shows high strength and a favorable strength to density ratio. The composite metal foams can be prepared by various techniques, such as powder metallurgy and casting including aspiration casting.

4 Claims, 20 Drawing Sheets

METAL FOAM CONTAINING HOLLOW SHELLS AND METHODS OF PREPARATION

RELATED APPLICATION

This application claims priority under 35 U.S.C. 119(e) from Provisional U.S. Patent Application Ser. No. 61/351,823 filed Jun. 4, 2010.

FIELD OF THE INVENTION

The present invention is directed to syntactic metal foams and methods of preparation thereof. The syntactic foams generally comprise hollow metallic shells and a solid metal matrix. What is disclosed is an improved syntactic foam of a metal matrix and hollow metal shells. The material is characterized by improved material compatibility, improved ordering of the hollow shells in the matrix, improved geometric shaping of the hollow shells, beneficial additives to the matrix, and improved post processing steps.

BACKGROUND

A foam is a substance that is formed by trapping many gas bubbles in a liquid or solid. The term foam may also refer to anything that is analogous to such a phenomenon, such as quantum foam, polyurethane foam (foam rubber), EPS (Expanded Polystyrene) foam, Polystyrene, or many other manufactured foams. Fine foam can be considered a type of colloid. Syntactic foam is foam produced of composite materials synthesized by filling a matrix with hollow particles or shells. The matrix material can be selected from any suitable metal, metalloid, polymer, or ceramic. A wide variety of hollow shells are available, including cenospheres, glass microspheres, and carbon and polymer microballoons, hollow ceramic and metal or metalloid shells. The presence of hollow shells results in lower density, higher strength, a lower coefficient of thermal expansion, and, in some cases, radar or sonar transparency.

The compressive properties of syntactic foams primarily depend on the properties of the hollow shells, whereas the tensile properties depend on the matrix material that holds the shells together.

Customization is one of the biggest advantages of syntactic foams. There are several ways of adjusting the properties of these materials. One method is to change the volume fraction of hollow shells in the syntactic foam structure. A second method is to use hollow shells of different wall thickness. A third method is to adjust the geometrical shape of the shells. In general, the compressive strength of the material is proportional to its density.

Syntactic materials were developed in early 1960s as buoyancy aid materials for marine applications. Other characteristics led these materials to aerospace and ground transportation vehicle applications. Current applications for syntactic foam include buoyancy modules for marine riser tensioners, boat hulls, deep-sea exploration, autonomous underwater vehicles (AUV), parts of helicopters and airplanes, and sporting goods such as soccer balls.

Metallic foams are known in the prior art. Metal foams are a class of materials with very low densities and novel mechanical, thermal, electrical, and acoustic properties. In comparison to conventional solids and polymer foams, metal foams are light weight, recyclable, and non-toxic. Metal foams offer high specific stiffness, high strength, enhanced energy absorption, sound and vibration dampening, and tolerance to high temperatures. By altering the size and shape of the cells in metal foams, mechanical properties of the foam can be engineered to meet the demands of a wide range of applications.

Various methods are known in the art for preparing metallic foams. According to one method, metal powders are compacted together with suitable blowing agents, and the compressed bodies are heated above the solidus temperature of the metal matrix and the decomposition temperature of the blowing agent to generate gas evolution within the metal. Such "self-expanding foams" can also be prepared by stirring the blowing agents directly into metal melts. Metallic foams can also be prepared as "blown foams" by dissolving or injecting blowing gases into metal melts. Metallic foams can also be prepared by methods wherein gasses or gas-forming chemicals are not used. For example, metal melts can be caused to infiltrate porous bodies, which are later removed after solidification of the melt, leaving pores within the solidified material.

Metallic foams of this type have been shown to experience fatigue degradation in response to both tension and compression. Plastic deformation under cyclic loading occurs preferentially within deformation bands, until the densification strain has been reached. The bands generally form at large cells in the ensemble, mainly because known processes for producing these materials do not facilitate formation in a uniform manner. Such large cells develop plastically buckled membranes that experience large strains upon further cycling and will lead to cracking and rapid cyclic straining. As a result, the performance of existing foams has not been promising due to strong variations in their cell structure as disclosed in Y. Sugimura, J. Meyer, M. Y. He, H. Bart-Smith, J. Grenstedt, & A. G. Evans, "On the Mechanical Performance of Closed Cell Al Alloy Foams", Acta Materialia, 45(12), pp. 5245-5259, incorporated herein by reference.

In the production of closed cell metallic foams, one obstacle is the inability to finely control cell size, shape, and distribution. This makes it difficult to create a consistently reproducible material where the properties are known with predictable failure. One method for creating a uniform closed cell metallic foam is to use prefabricated spheres of a known size distribution and join them together into a solid form, such as through sintering of the spheres, thereby forming a closed cell Hollow Sphere Foam (HSF).

In addition to metal foams formed with a blow gas, there are also syntactic metal foams. In this case, a metal matrix surrounds a hollow shell composed of glass, ceramic, metal, or metalloid.

U.S. Pat. No. 4,568,389 (Torobin) describes a structure and method of producing closed cell metallic foam using hollow metal shells mixed into a metal matrix.

In 1998 a published report to the Office of Naval Research entitled "Fabrication and Microstructure of Metal-Metal Syntactic Foams", Dr. Nadler et al. further describes a metal-metal syntactic foam matrix composite microstructure consists of thin-wall, hollow Fe—Cr stainless steel spheres cast in various metal matrices including aluminum alloys 6061, 7075, 413, magnesium alloy AZ31B, and unalloyed aluminum and magnesium. Stainless steel spheres fabricated by the team were sufficiently uniform to allow arrangement into random or periodic arrays. These arrays were infiltrated by an aspiration casting process, resulting in hollow shells with an interstitial metal matrix. During their research the team reported intermetallic formation on the boundaries of the hollow shells due to interaction of iron of the sphere and the alumina of the matrix.

U.S. Pat. No. 7,641,984 (Rabiei) discloses metal spheres in a metal matrix fabricated with powder processing and casting techniques. This patent does not sufficiently address the problem of intermetallics forming between the matrix material and shell material. Additionally, the proposed method does not optimize the interstitial matrix. In this case, shells that are in contact with other shells induce voids resulting in reduced strength.

SUMMARY OF THE INVENTION

This invention is an improved composite metallic foam comprising hollow metal spheres and a solid metal matrix. The material is characterized by improved material compatibility, improved ordering of the hollow shells in the matrix, improved geometric shaping of the hollow shells, beneficial additives to the matrix, and improved post processing steps.

The foam exhibits low density and high strength. Generally, the composite metallic foam is prepared by filling in the spaces around the hollow metallic spheres, thus creating a solid matrix. Such preparation can be by various methods, including powder metallurgy techniques and casting techniques. The composite metallic foams of the invention have unique properties that provide use in multiple applications, such as marine structures, space vehicles, automobiles, and buildings. The foams are particularly useful in applications where weight is critical and vibration damping, as well as energy absorption, are useful, such as blast panels for military applications and crumple zones for automotive crash protection. The application of the foams can also be extended into biomedical engineering as medical implants and even to civil engineering for earthquake protection in heavy structures.

The composite metal foams of this invention have controlled porosity through use of preformed hollow metallic shells and foam cell wall support, and through addition of a metal matrix surrounding the hollow metallic shells, and exhibit highly improved mechanical properties, particularly under compression loading.

In one aspect of this invention, there is provided a composite metal foam comprising a plurality of hollow shells (preferably hollow metallic shells) and a metal matrix generally surrounding the hollow shells. The hollow shells and the matrix can be comprised of the same or different materials. In one embodiment, the hollow shells are metallic spheres comprising various metals or metal alloys including steel or titanium. The metal matrix comprises aluminum, aluminum alloys, magnesium, or magnesium alloys. The hollow shells can be coated with beneficial materials to improve compatibility with the matrix material and reduce the formation of intermetallics. Such beneficial materials include nickel, copper, titanium, zinc, magnesium, chromium, cadmium, and alloys thereof.

According to another aspect of the invention, there is provided a method of preparing a composite metallic foam by placing a plurality of hollow metallic shells in a mold and filling the spaces around the hollow metallic shells with a metal matrix-forming material.

In one aspect of the invention hollow metallic shells can be positioned for optimum packing. In this case it may be desirable to hold the shells in position with a metal mesh. In addition to holding the shells in place the mesh can provide a net shape form and also add tensile strength to the foam.

The prior art recognizes the possibility of shapes other then spherical. However, hollow shells of shapes other then essentially spheres have not been previously available. Additionally, shells other then spherical are difficult to pack. Novel hollow shell shapes are disclosed in this invention.

DETAILED DESCRIPTION OF THE DRAWINGS

Figure 1:
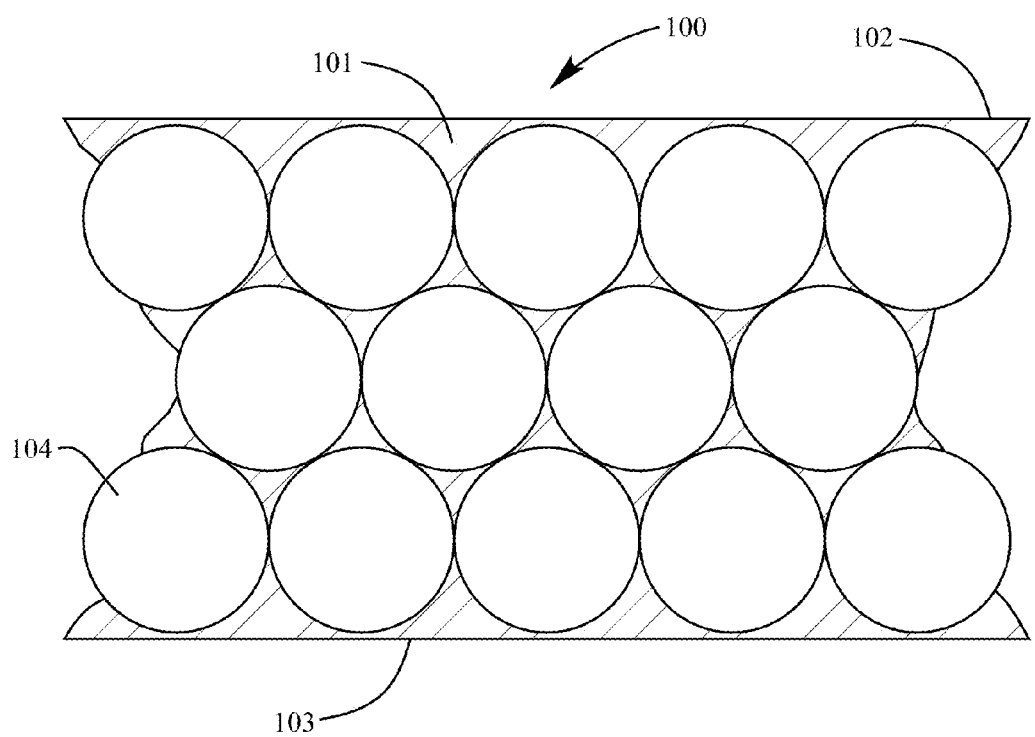
FIG. 1 is a top view of metal spheres in a metallic foam matrix.

FIG. 1 shows metal shells in a metal foam matrix. FIG. 1 illustrates the use of the metal microspheres to form a light weight metal structure 100 having a continuous phase of metal or metal alloy 101 and a discontinuous phase of hollow metal microspheres 104. The light weight metal structure can be made by uniform mixing or dispersing the metal microspheres (until the desired packing is obtained) in a metal or metal alloy powder and compressing the mixture of metal powder and microspheres to compact the mixture. The mixture is then heated under pressure to melt the metal powder and is cooled.

Hollow Shell Shapes

Figure 2:
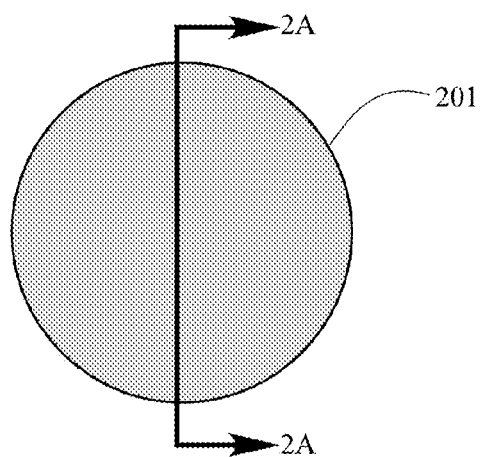
FIG. 2 is a side view of a hollow metal sphere.

FIG. 2 is a side view of a hollow metal sphere 201.

Figure 2A:
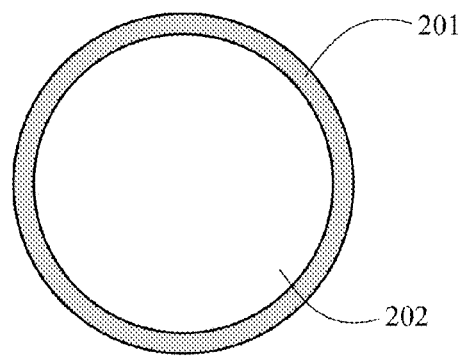
FIG. 2A is a section 2A-2A view of a hollow metal sphere.

FIG. 2A is a section 2A-2A view of a hollow metal sphere 201. It is composed of a metal shell 201 surrounding a hollow interior 202. The shell 201 can be fabricated of pure metal or any metal alloy. Typical shell diameters are between 0.5-50 millimeters. Other diameters are possible. The shell 201 thickness can be varied with respect to the total diameter. Typically the shell thickness is about 10% of the diameter but other thickness can be fabricated including shell thickness of between 5% to 50% of the diameter. Increasing the shell thickness relative to the outer diameter will increase the effective density of the shell. It will also increase the strength.

Hollow shells produced in accordance with this invention are fabricated by coating expendable spherical cores with metal or metal oxides particles bound in a slurry. The coated cores are subject to heat. The cores are pyrolized and the shell is sintering impervious. If metal oxides are used, sintering must be done in a reducing atmosphere. Suitable core materials include, but is not limited to, polystyrene. Other core shapes are possible. Cores can be shaped using a variety of techniques including stamping and molding.

Figure 3:
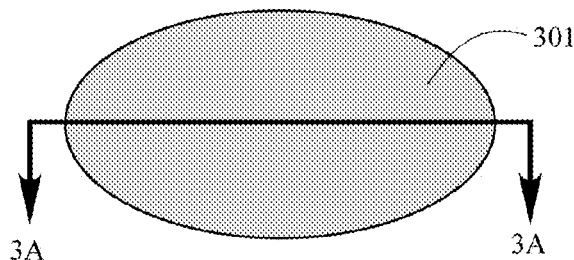
FIG. 3 is a side view of a hollow metal ellipsoid.

FIG. 3 is a side view of a hollow metal ellipsoid 301.

Figure 3A:
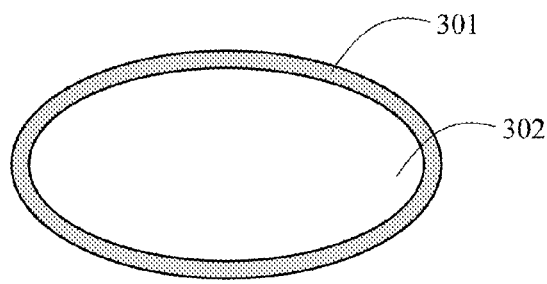
FIG. 3A is a section 3A-3A view of a hollow metal ellipsoid.

FIG. 3A is a section 3A-3A view of a hollow metal ellipsoid 301 surrounding a hollow interior 302. It is formed by coating a core that is an ellipsoid. An ellipsoid is a useful shape as it allows highly dense packing densities of up to 74%.

Figure 4:
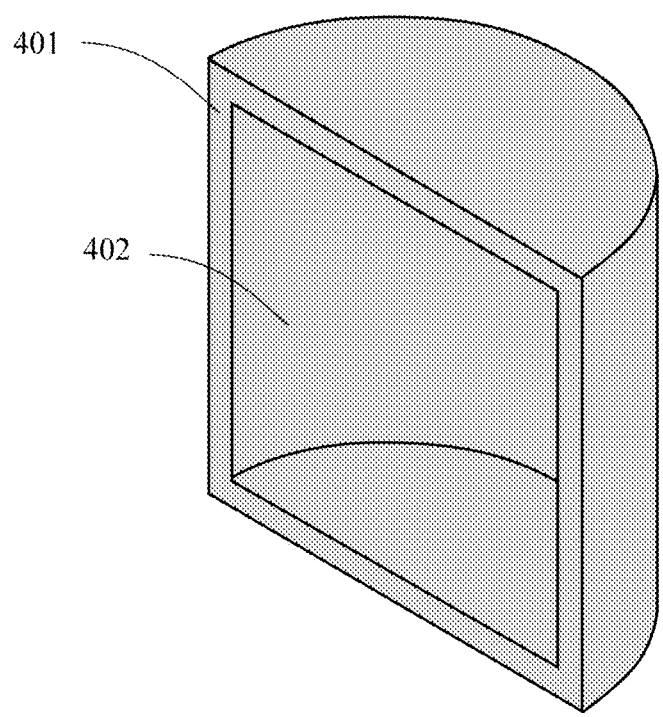
FIG. 4 is a bisected perspective view of a circular cylinder (similar to a small column).
Figures 5, 5A:
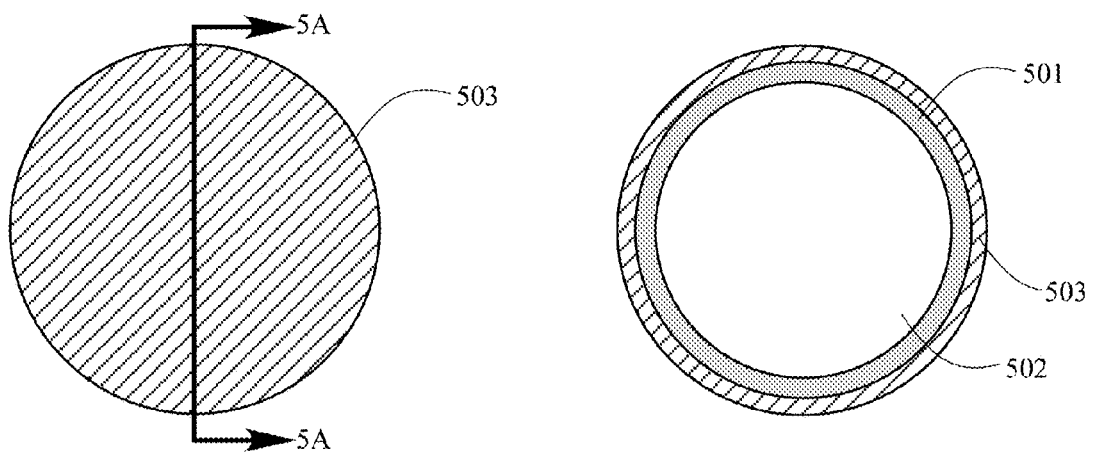
FIG. 5 is a side view of a hollow metal sphere with an optional beneficial coating.
FIG. 5A is a section 5A-5A view of a hollow metal sphere with an optional beneficial coating.
Figure 6:
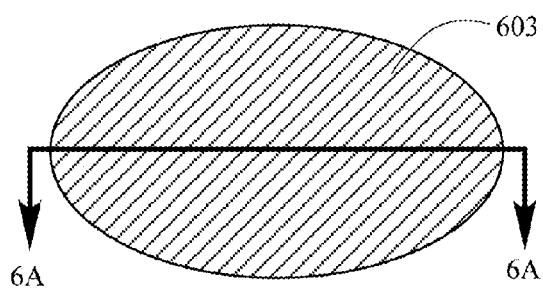
FIG. 6 is a side view of a hollow metal oval sphere with an optional beneficial coating.
Figure 6A:
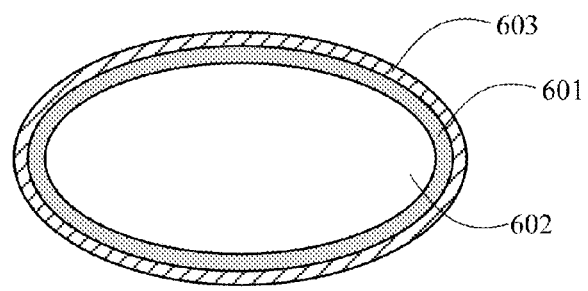
FIG. 6A is a section 6A-6A view of a hollow metal oval sphere with an optional beneficial coating.
Figure 7:
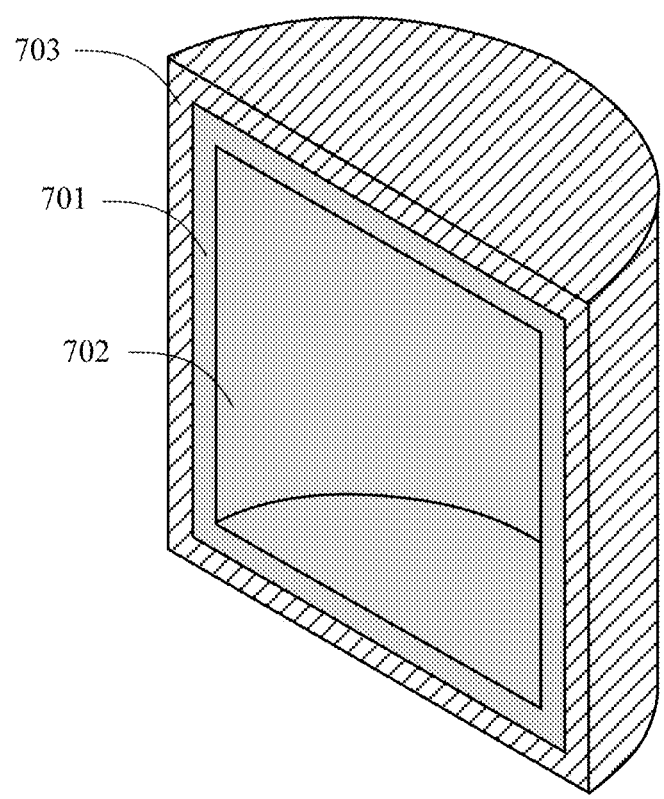
FIG. 7 is a bisected perspective view of a circular cylinder (similar to a small column) with an optional beneficial coating.
Figure 8:
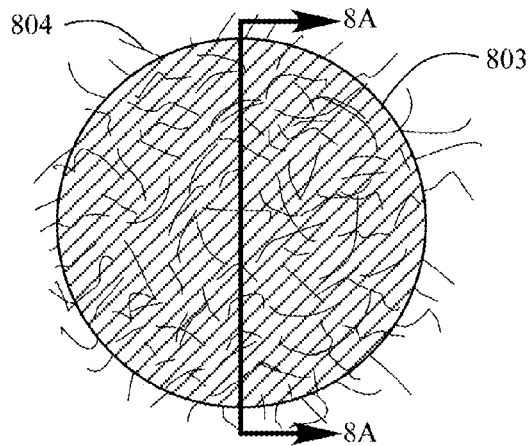
FIG. 8 is a side view of a hollow metal sphere with an optional beneficial coating of whiskers or fibers.
Figure 8A:
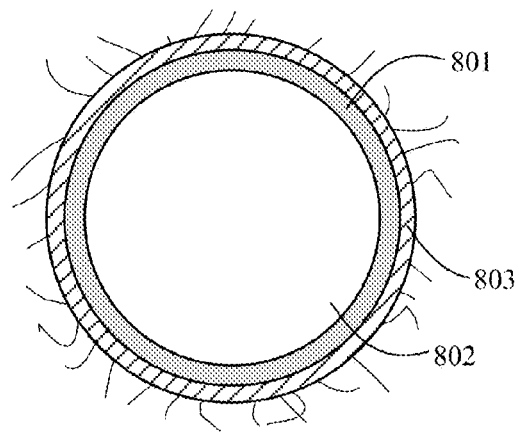
FIG. 8A is a section 8A-8A view of a hollow metal sphere with an optional beneficial coating of whiskers or fibers.
Figure 9:
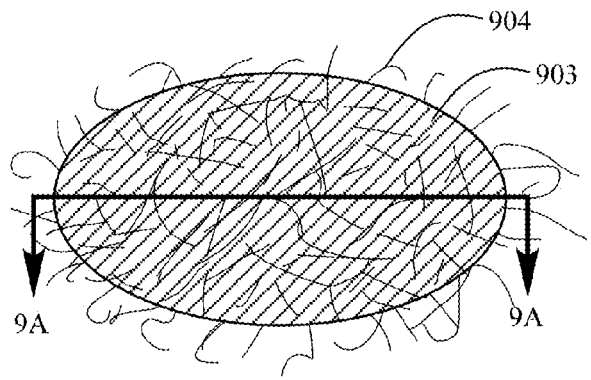
FIG. 9 is a side view of a hollow metal oval sphere with an optional beneficial coating of whiskers or fibers.
Figure 9A:
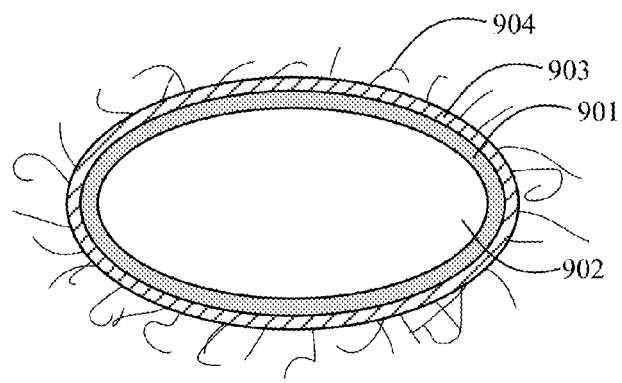
FIG. 9A is a section 9A-9A view of a hollow metal oval sphere with an optional beneficial coating of whiskers or fibers.
Figure 10:
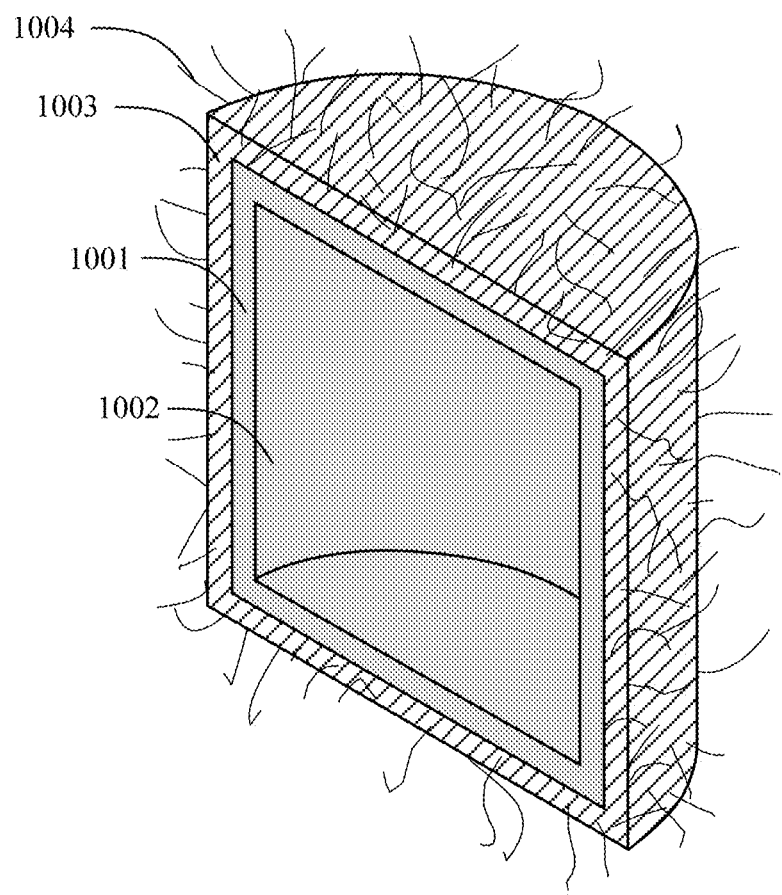
FIG. 10 is a bisected perspective view of a circular cylinder (similar to a small column) with an optional beneficial coating of whiskers or fibers.

FIG. 4 is a bisected perspective view of a circular cylinder 401 (similar to a small column) surrounding a hollow interior 402.

Right circular cylinders 401 can be fabricated to have a ratio of height to diameter of between 1 to 4 and 10 to 1. Other ratios are possible. Other shapes include right hexagonal cylinders are also possible.

Beneficial Coating of Hollow Shells

Regardless of the shape, hollow shells can be coated with additional beneficial coatings. FIGS. 5, 5A, 6, 6A and 7 are examples of shells fabricated with an optional beneficial coating (503, 603, 703). The coating can be applied to the exterior of the shell (501, 601, 701). Beneficial coatings include materials that improve wetting between the matrix and the sphere and form barriers to prevent the formation of intermetallics. Such materials include nickel, copper, titanium, zinc, magnesium, chromium, cadmium, and/or their alloys.

FIGS. 8, 8A, 9, 9A, and 10 illustrate other optional beneficial coatings of whiskers or fibers (804, 904, 1004). It can be applied alone or in conjunction with other beneficial coatings (803, 903, 1003). Fibers or whiskers (804, 904, 1004) can be selected from any material that will withstand the processing temperatures of metals. This includes metal, metalloid, glass, ceramics, and glass ceramics. Fibers or whiskers (804, 904, 1004) add strength and can help interlock the hollow shells (801, 901, 1001) in place.

Improved Ordering of Hollow Shells in Matrix

In order to have uniform mechanical properties, it is desirable to have a uniform distribution of hollow shells in the metal matrix. It is additionally desirable have a matrix that is free of voids or air pockets. One method of achieving a uniform distribution is to use shells that are neutrally buoyant with respect to the matrix metal.

If the shells are not the same density they may tend to sink or float. In this case one or more layers of mesh can be used to trap the hollow shells in evenly spaced arrangements. The mesh can also be used to facilitate complex net shapes and or separate different kinds of hollow shells.

In some embodiments, it may be useful to use screens, or other similar means, for maintaining the arrangement of the spheres within the mold. In addition to gravity casting, the mold may be subject to pressure differentials during the cast process. For example, in one embodiment, the mold may be pressurized. In another embodiment, the mold may be under a vacuum.

Figure 11A:
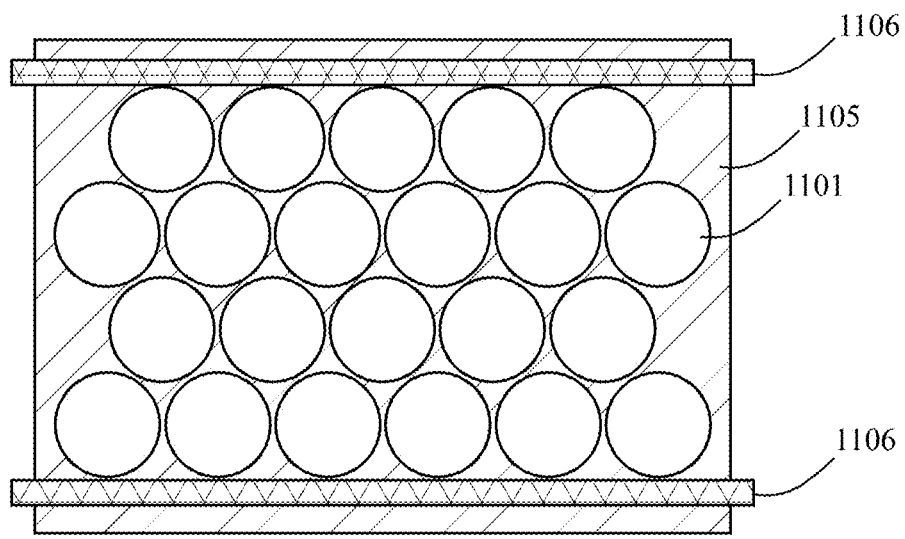
FIG. 11A is a side view of hollow metal spheres in a close packed arrangement surrounded by a metal matrix held in place by a mesh.

FIG. 11A is a side view of hollow metal spheres 1101 in a close packed arrangement surrounded by a metal matrix 1105 held in place by a mesh 1106.

Figure 11B:
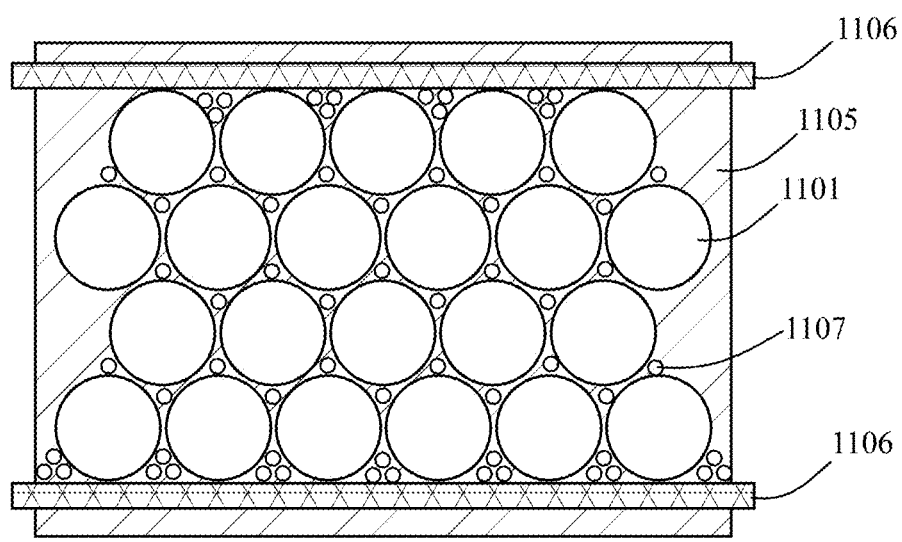
FIG. 11B shows an alternative packing of hollow spheres comprised of a bi-model size distribution.

FIG. 11B shows an alternative packing of hollow spheres comprised of a bi-model size distribution. Small diameter spheres 1107 of less then one seventh of the diameter of the large spheres 1101 can be interspersed between the larger spheres 1101. The result is denser packing. Additionally whiskers as shown in FIG. 4 can be used to facilitate locking of the sphere in place.

This can be accomplished in conjunction with a mesh 1106 or in place of a mesh.

Figure 12:
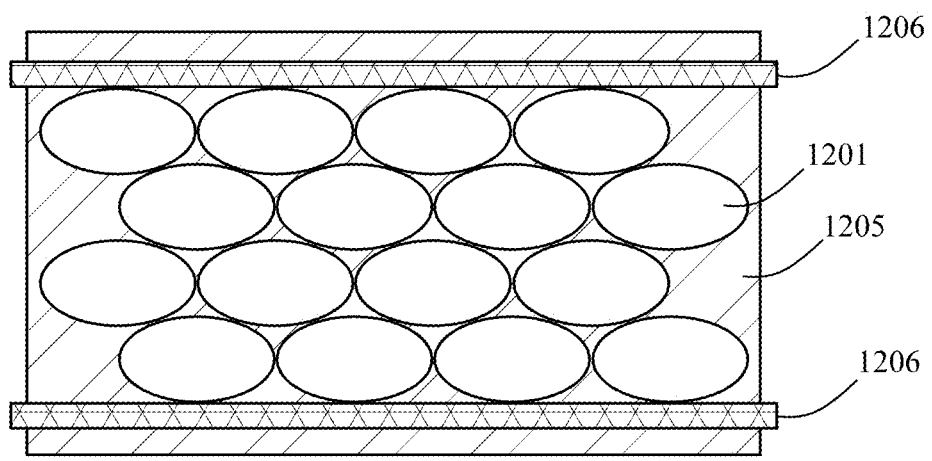
FIG. 12 shows ellipsoid shaped hollow shells in a metal matrix sandwiched between metal mesh cages.

FIG. 12 shows ellipsoid shaped hollow shells 1201 in a metal matrix 1205 sandwiched between metal mesh cages 1206. The ellipsoid shapes have a natural tendency to pack in an ordered array.

Right cylinders with a circular, hexagonal, or square face will provide additional beneficial properties to a metal matrix if they are properly ordered.

Figure 13A:
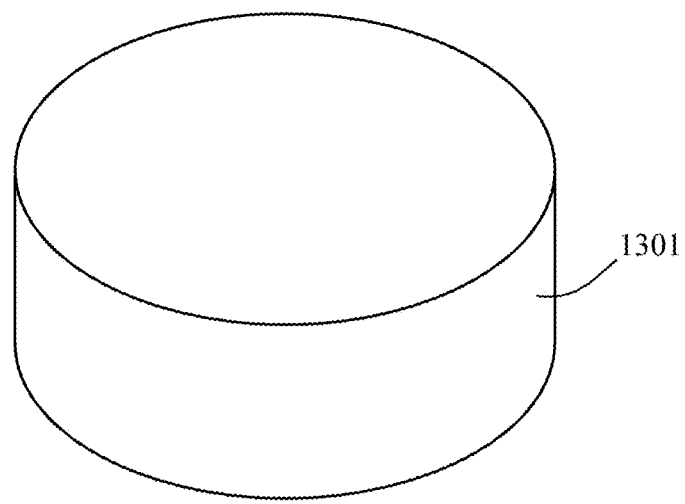
FIG. 13A is a perspective view of a hollow right circular cylinder.

FIG. 13A is a perspective view of a hollow right circular cylinder 1301.

Figure 13B:
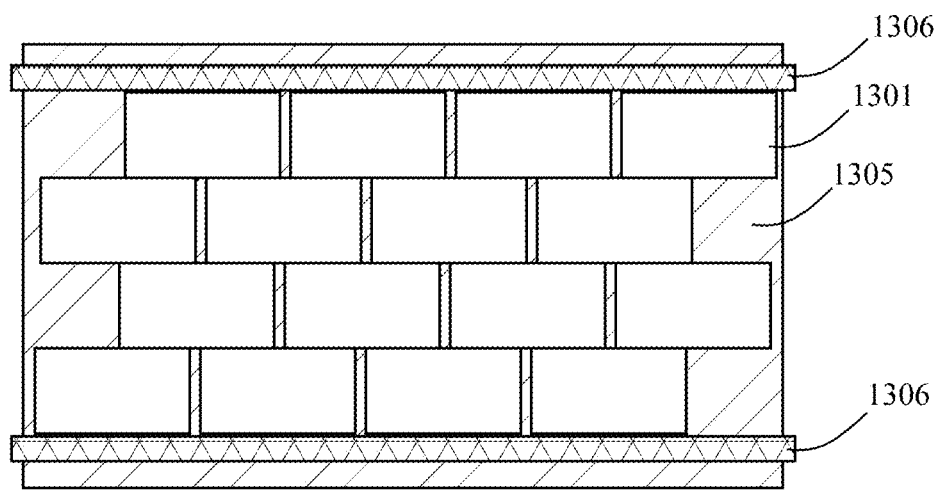
FIG. 13B shows a matrix of hollow right circular cylinders stacked between a mesh cage with metal matrix material surrounding.

FIG. 13B shows a matrix of hollow right circular cylinders 1301 stacked between a mesh cage 1306 with metal matrix material 1305 surrounding. In this case, the circular faces of the right circular calendar are all ordered in the same direction.

Figure 14A:
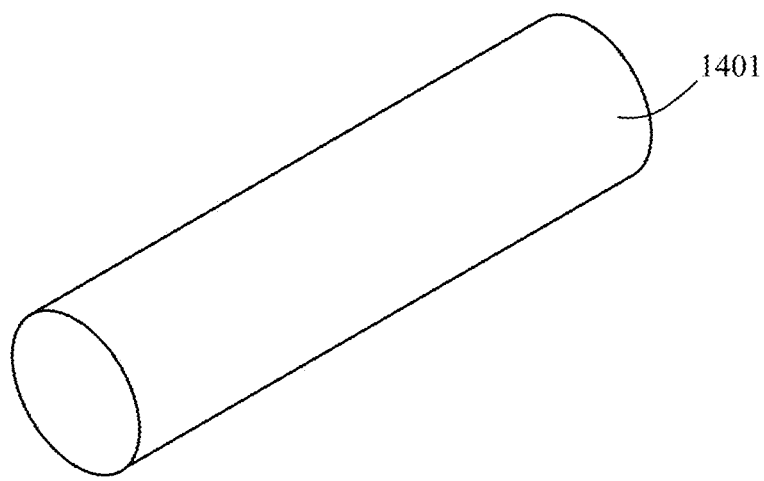
FIG. 14A is a perspective view of a hollow right circular cylinder with a different aspect ratio.

FIG. 14A is a perspective view of a hollow right circular cylinder 1401 with a different aspect ratio.

Figure 14B:
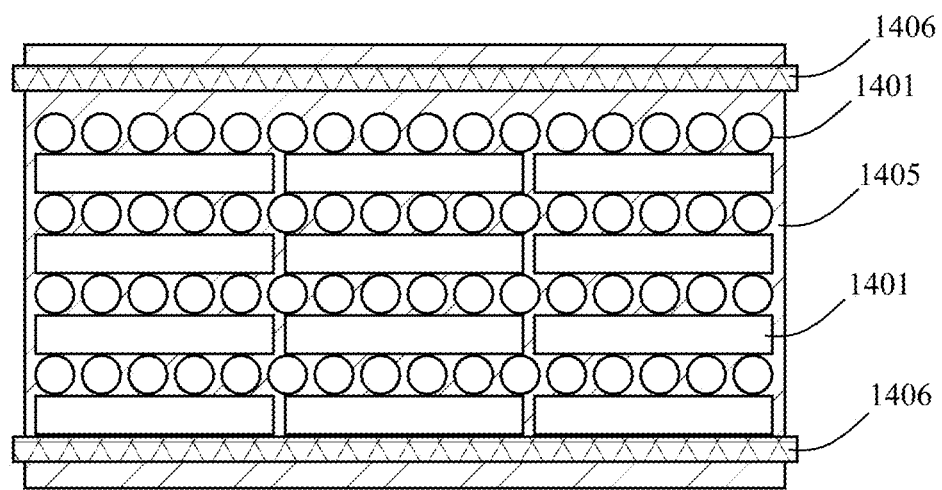
FIG. 14B shows an alternative alignment in which the hollow right circular cylinders have a different aspect ratio and are aligned differently with respect to the metal cage

FIG. 14B shows an alternative alignment in which the hollow right circular cylinders 1401 have a different aspect ratio and are aligned differently with respect to the metal cage 1406. FIG. 14B also illustrates that different layers can have different orientation.

Figure 15:
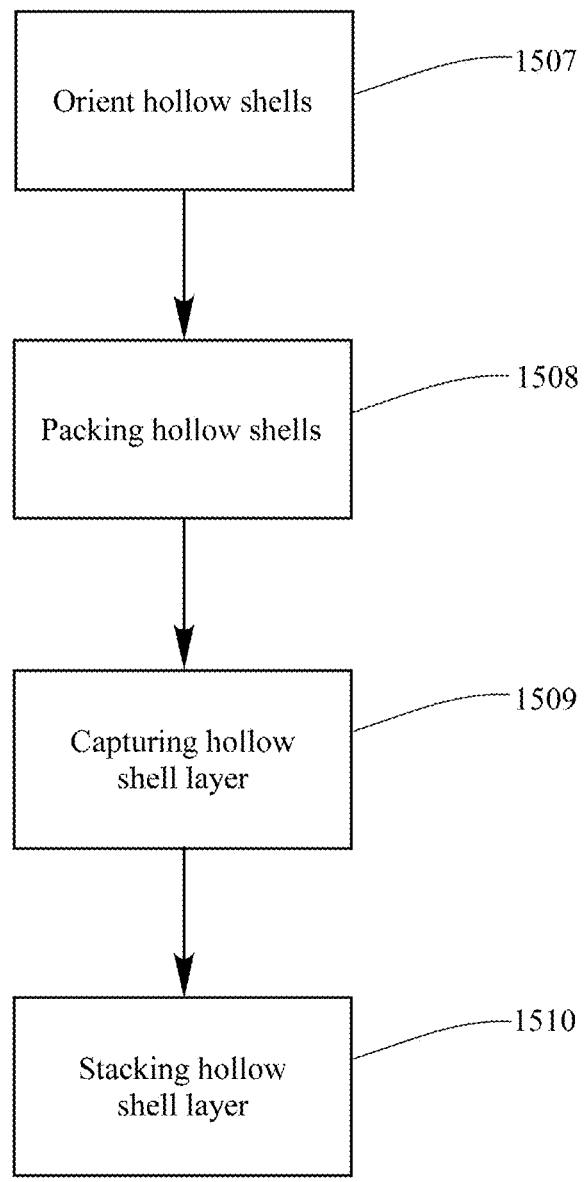
FIG. 15 illustrates a process for ordering hollow shells into uniform alignment.

Hollow shells can be ordered in one or more layers. A single ordered layer can be achieved through various vibratory and mechanical means. After the desired order is achieved, the shells can be captured by tape to prevent further motion. FIG. 15 illustrates a process for ordering hollow shells into uniform alignment. The process consists of orienting hollow shells 1507, packing the hollow shells together 1508, capturing the hollow shell layers 1509, and stacking the hollow shell layers 1510.

Figure 15A:
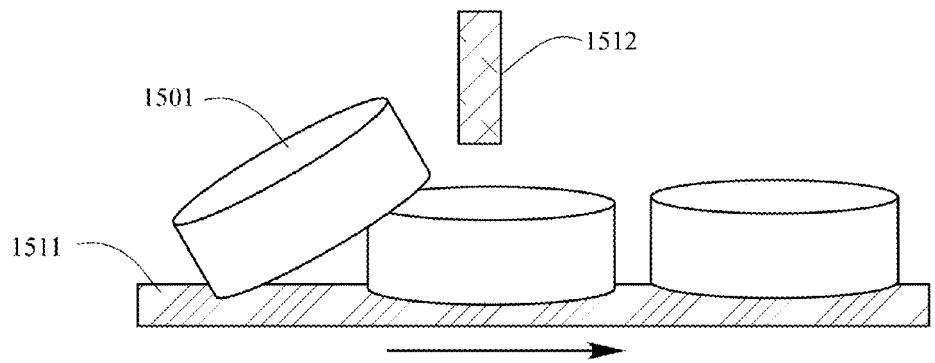
FIG. 15A illustrates a simple method of orienting hollow shells.

FIG. 15A illustrates a simple method of orienting hollow shells 1501. Hollow shells 1501 are randomly poured onto a conveyor belt 1511 and passed under a bar 1512 of specified height. Shells 1501 will only pass under the bar if they are in correct orientation. Optional brushing means (not shown) can be used to prevent clogs.

Figure 15B:
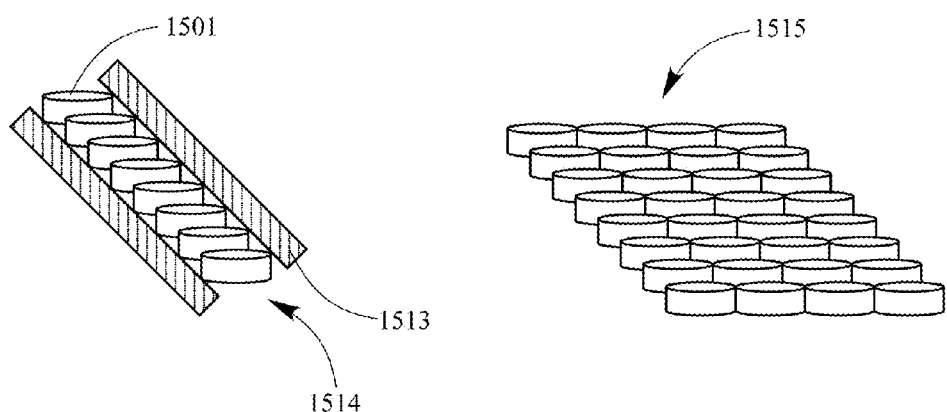
FIG. 15B shows shells being mechanically positioned for a close packing.

FIG. 15B shows shells 1501 being mechanically positioned for a close packing. Hollow shells 1501 are organized into rows 1514 through mechanical means 1513. Rows 1514 are grouped into arrays 1515.

Figure 15C:
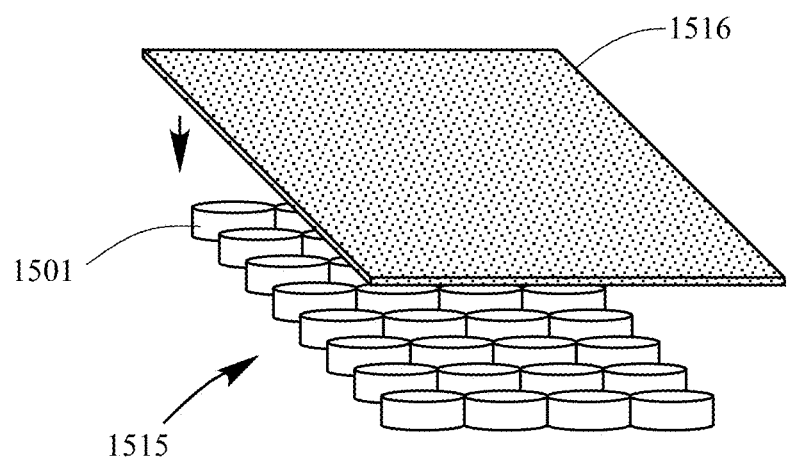
FIG. 15C shows one means of capturing arrays of hollow shells.

FIG. 15C shows a means of capturing arrays 1515 of hollow shells 1501 with sticky tape 1516.

Figure 15D:
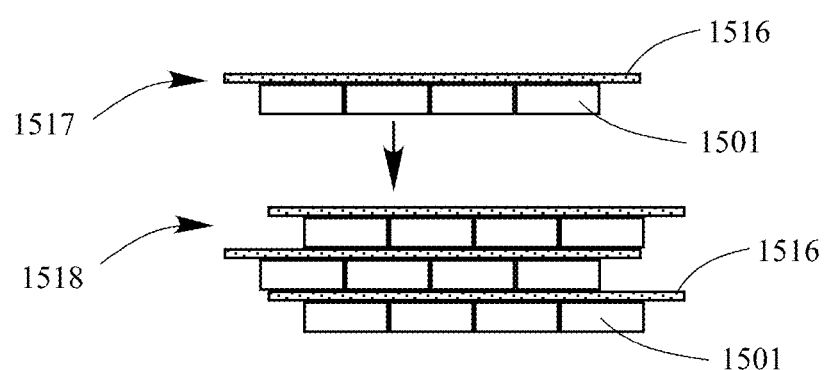
FIG. 15D single arrays of hollow shells are stacked to form three dimensional arrays.

In FIG. 15D single arrays 1517 of hollow shells 1501 are stacked to form three dimensional arrays 1518. The arrays 1518 can be place in optional mesh cages (not shown). The tape 1516 between layers can be pyrolized prior to introducing the molten metal matrix.

Optional Heat Treatments

Heat treating the alloys increases strength and hardness of the precipitation-hardenable wrought and cast alloys. These usually are referred to as the "heat-treatable" alloys to distinguish them from those alloys in which no significant strengthening can be achieved by heating and cooling. Heat treatment to increase strength of an alloy is a three-step process:

Solution heat treatment: dissolution of soluble phases
    Quenching: development of supersaturation
    Age hardening: precipitation of solute atoms either at room temperature (natural aging) or elevated temperature (artificial aging or precipitation heat treatment).

In the case of a metal matrix comprised of hollow shells of one alloy encapsulated by hollow shells of another alloy it is beneficial to apply two or more heat treatment cycles to the matrix to optimally strengthen each of the components.

Figure 16:
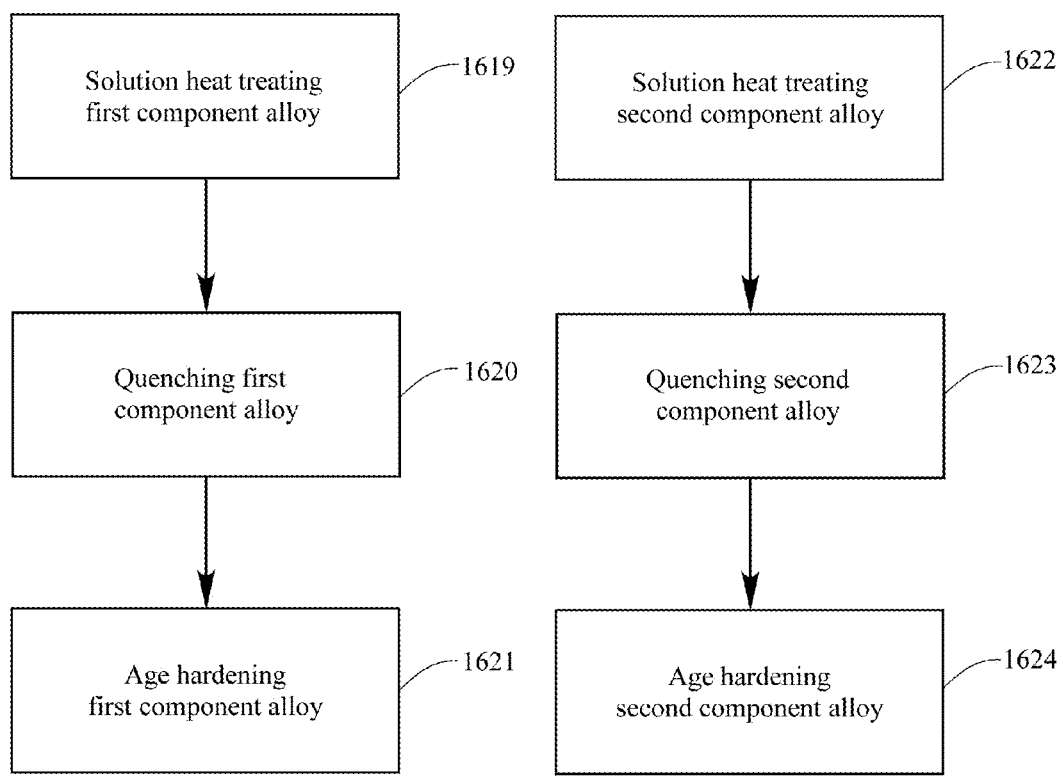
FIG. 16 is a block diagram illustrating the process of heat-treating two metals in a foam matrix.

FIG. 16 shows the steps of heat-treating two metals in a foam matrix. Each metal will undergo the process of heat-treating, quenching, and age hardening. The two heat treating processes can take place sequentially or overlap depending on the heat cycles of the alloys.

Optional Process Atmospheres

Process temperatures, including temperatures required for melting the metal matrix or preheat the shell arrangement prior to infiltration of the metal matrix may have a detrimental effects on the shell surface. For example shells may oxidize in high temperature. Therefore may be beneficial to carry out at least a portion of the process in an inert atmosphere composed of argon or nitrogen.

Additionally, other beneficial atmospheres may be used including reactive atmospheres composed of hydrogen or carbon monoxide. Such atmospheres prevent oxidation and also remove potential contaminants or impurities.

Interstitial Matrix

Figure 17:
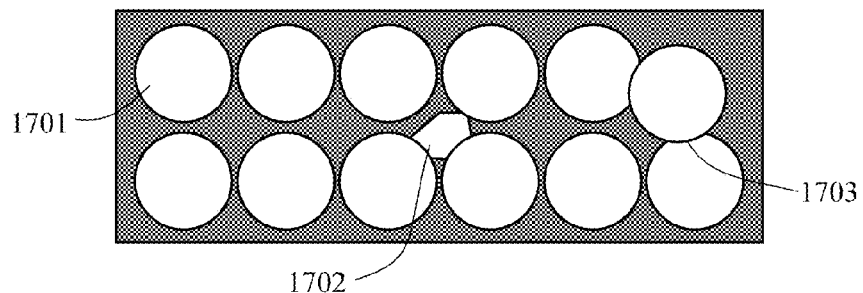
FIG. 17 shows shells in a foam matrix.

To achieve high strength syntactic foams it is desirable to have good bonding between the surfaces of the various matrix components. Methods of achieving a good bond between the shell and the matrix material including the addition of a beneficial coating have previously been described herein. Additionally, it is important that the matrix flow or coat all around the hollow shell components 1701 as shown in FIG. 17. In general, it is undesirable to have voids 1702 in the matrix. It is undesirable to have the hollow shells in contact with one another without the matrix or other means binding them together (item 1703). In the case of casting the metal matrix into the shells, it is desirable to agitate or vibrate the casting while it is in the mold. This can be done with various vibratory means or inductive heating. Inductive heating elements will magnetically "stir" the hollow shells if they contain iron.

Figure 18:
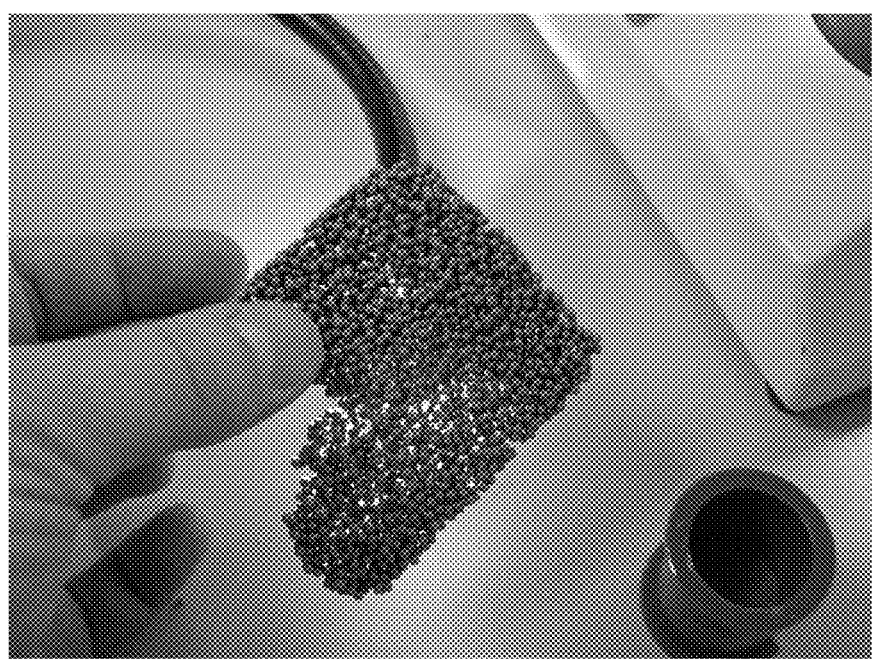
FIG. 18 shows shells bonded together in a sintering process prior to introducing the metal matrix.

Conversely, it may be beneficial to bond metal shells together prior to introducing the matrix. In this case the metal shells are arranged in a matrix and sintered until they bond at points of contact. Next, the metal is infused into the spacing between bonded shells. Shell shape and position can be optimized to allow easy flow of the metal matrix material. FIG. 18 shows shells bonded together in a sintering process prior to introducing the metal matrix.

Preferred Embodiments

Figure 19:
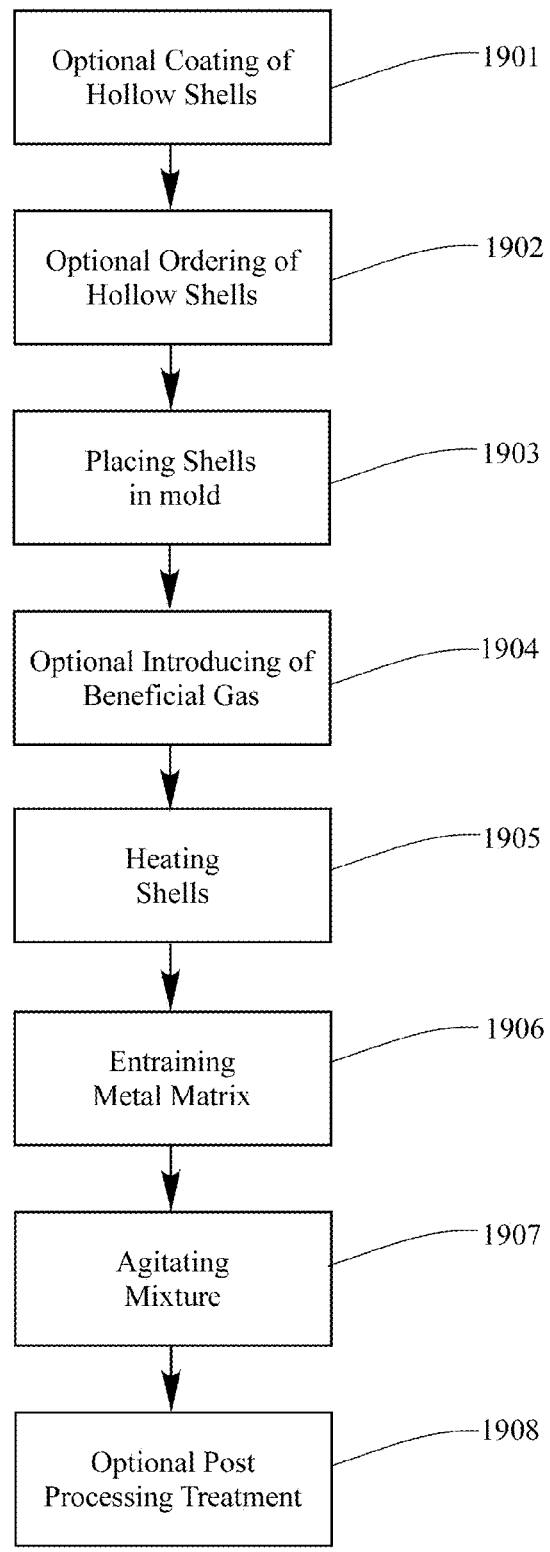
FIG. 19 is a block diagram illustrating the process of heat-treating two metals in a foam matrix.

FIG. 19 illustrates process steps for producing metal foam composed of metal shells in a metal matrix in which the shells are not sintered to neighboring shells prior to processing. Shells are coated with beneficial material 1901. Shells are ordered 1902 and placed in a mold 1903. Beneficial atmosphere including inert or reducing gas is introduced 1904 prior to the introduction of the molten metal matrix material. Beneficial atmosphere may also be held at a vacuum to help reduce voids. In the case of a casting process, shells are heated 1905 prior to entraining the molten metal matrix 1906. The shells in the metal matrix are agitated to remove voids in the matrix and assure continuous contact with the shells 1907. The last step is optional post processing tremens including cooling 1908.

Figure 20:
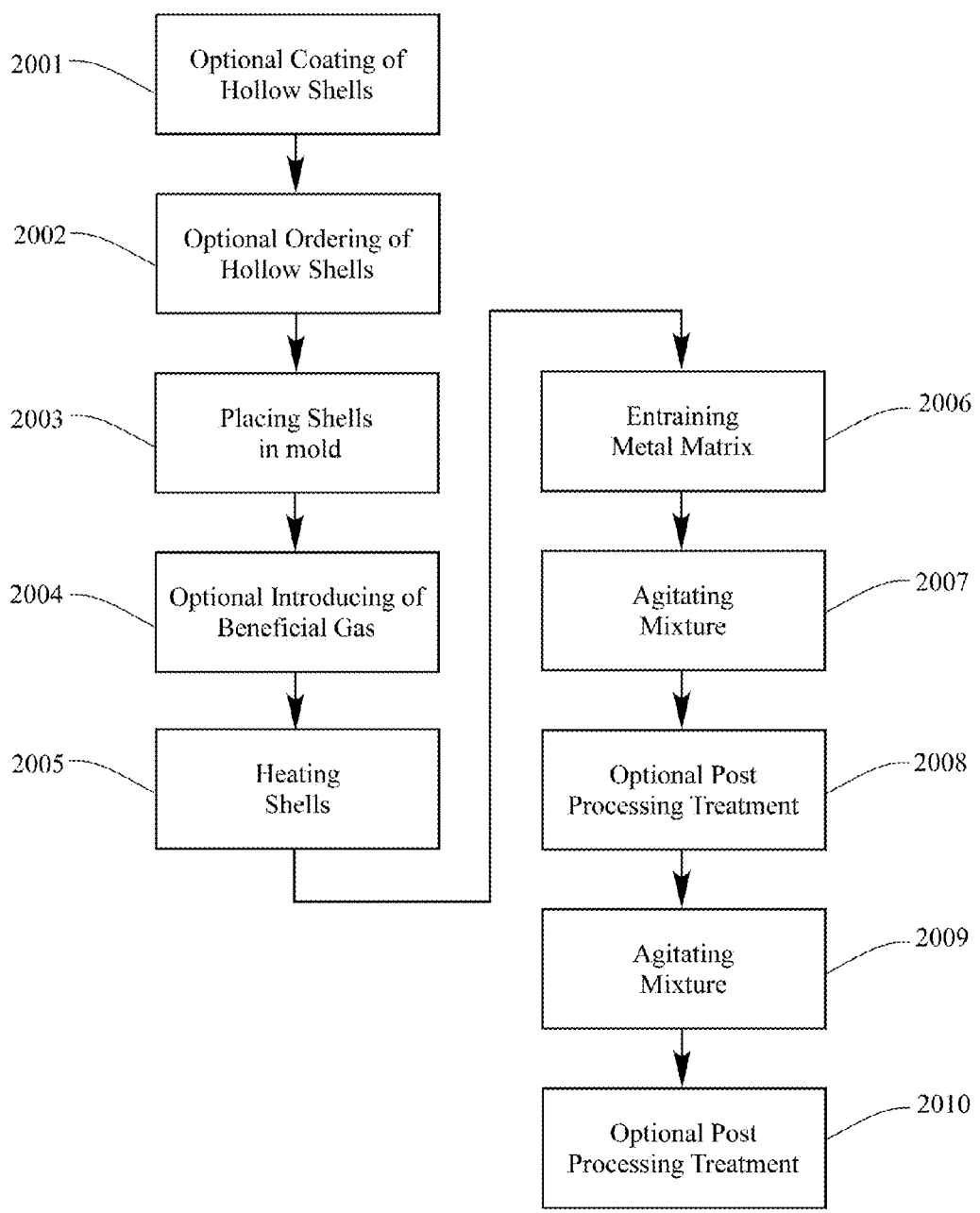
FIG. 20 is a block diagram illustrating the process of heat-treating two metals in a foam matrix.

FIG. 20 illustrates process steps for producing metal foam composed of metal shells in a metal matrix in which the shells are sintered to neighboring shells prior to processing. Shells are optionally ordered 2001, placed in a mold 2002 and sintered 2004. A beneficial gas may be used in the sintering process 2003. Shells are optionally coated with beneficial material 2005.

Beneficial atmosphere including inert or reducing gas is introduced 2006 prior to the introduction of the molten metal matrix material. Beneficial atmosphere may also be at a vacuum to help reduce voids. In the case of a casting process, shells are heated 2007 prior to entraining the molten metal matrix 2008. The mold is agitated to remove voids in the matrix and assure continuous contact with the shells 2009. The last step is optional post processing tremens including cooling 2010.

Figure 21:
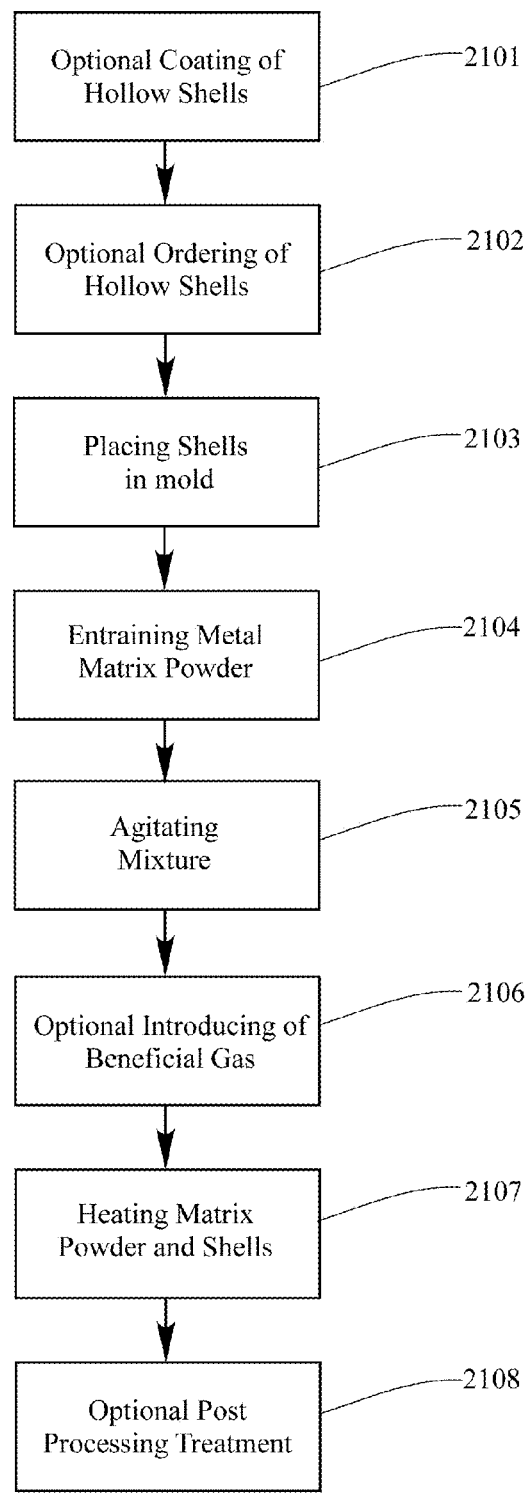
FIG. 21 is a block diagram illustrating the process of heat-treating two metals in a foam matrix.

FIG. 21 illustrates process steps for producing metal foam composed of metal shells in a metal matrix in which the shells are not sintered to neighboring shells prior to processing. Shells are coated with beneficial material 2101. Shells are ordered 2102 and placed in a mold 2103). Metal matrix powered is entrained between the shells 2104. The mixture is agitated 2105 to assure through even distribution of powered. Beneficial atmosphere including inert or reducing gas is introduced 2106. Beneficial atmosphere may also be at a vacuum to help reduce voids. The shells and the matrix powder are sintered 2107. The last step is optional post processing tremens including cooling 2108.

Figure 22:
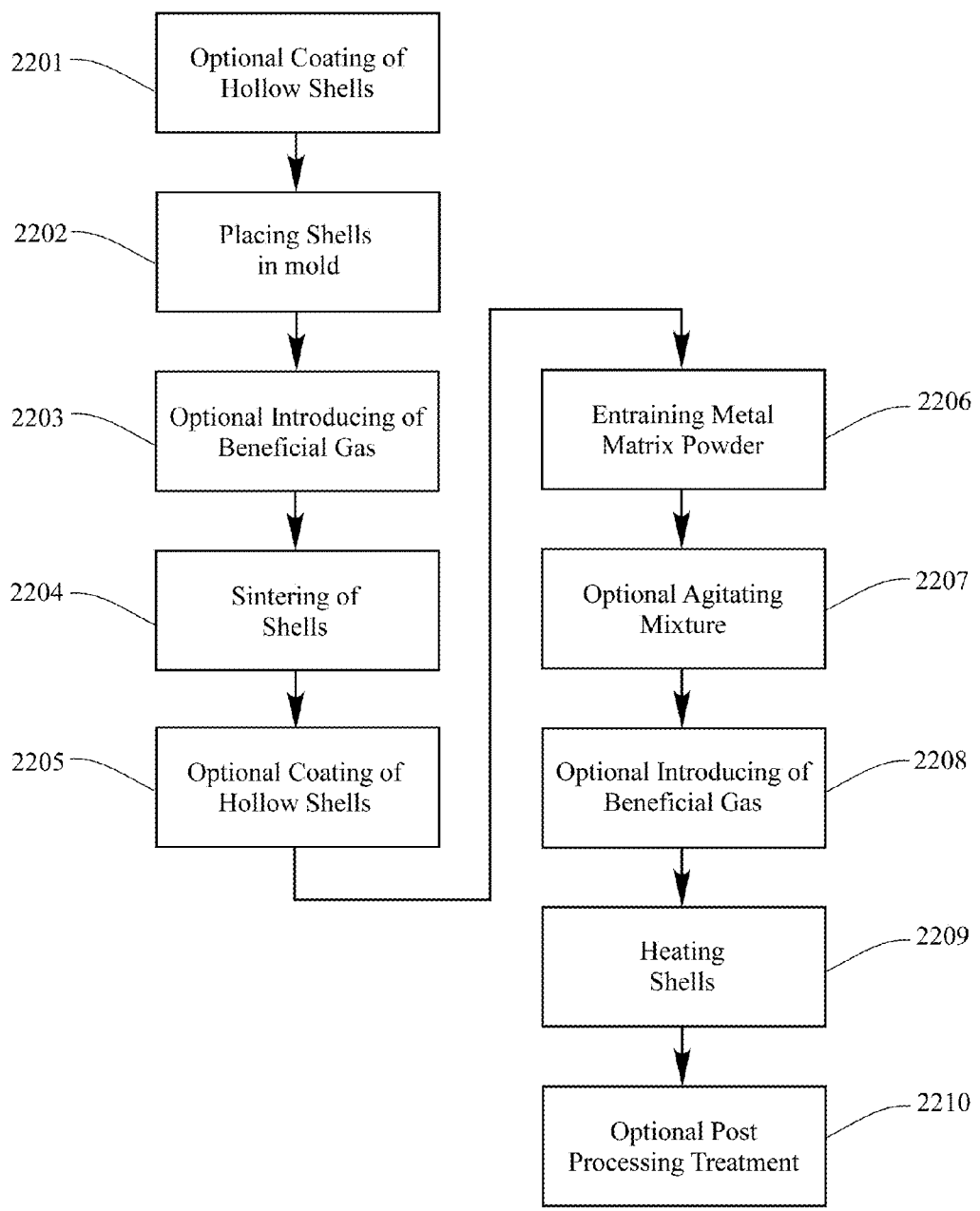
FIG. 22 is a block diagram illustrating the process of heat-treating two metals in a foam matrix.

FIG. 22 illustrates process steps for producing metal foam composed of metal shells in a metal matrix in which the shells are sintered to neighboring shells prior to processing. Shells are optionally ordered 2201, placed in a mold 2202 and sintered 2204. A beneficial gas may be used in the sintering process 2203. Shells are optionally coated with beneficial material 2205.

Metal powder is entrained between the shell spaces 2206. The mixture is optionally agitated 2207. Beneficial atmosphere including inert or reducing gas is introduced 2208 prior to heating. The atmosphere may be at vacuum to help remove voids. The mixture is sintered 2209. The last step is optional post processing tremens including cooling 2010.

Shell Materials

In some embodiments. the hollow shell may be constructed of any suitable material such as glass, ceramic, glass ceramic, plastic, and metal. Inorganic compounds of metals and/or metalloids, including alloys, mixtures, or combinations thereof are contemplated, such as oxides, carbides, nitrides, nitrates, silicates, silicides, aluminates, phosphates, sulfates, sulfides, borates, and borides.

The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, and bismuth.

Inorganic shell materials suitable for use are magnesium oxide(s), aluminum oxide(s), zirconium oxide(s), and silicon carbide(s) such as MgO, $Al_2O_3$, $ZrO_2$, $SiO_2$, and/or SiC.

The shell may also be composed of or contain carbides, borides, nitrides, silicides, sulfides, oxides and other compounds of metals and/or metalloids of Groups IV and V as disclosed and prepared in U.S. Pat. No. 3,979,500 (Sheppard et al.), incorporated herein by reference. Group IV compounds including borides of Group IVB metals such as titanium, zirconium, and hafnium and Group VB metals such as vanadium, niobium, and tantalum are contemplated.

In one embodiment, the shell is made of fused particles of glass, ceramic, glass ceramic, refractory, fused silica, quartz, or like amorphous and/or crystalline materials including mixtures of such.

In another embodiment, the shell is made of an aluminate silicate or contains a layer of aluminate silicate. It is also contemplated that the plasma-shell may be made of lead silicates, lead phosphates, lead oxides, borosilicates, alkali silicates, aluminum oxides, and pure vitreous silica.

The foregoing description of various embodiments of this invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A metal syntactic foam comprising hollow shells in a metal matrix in which the hollow shells are coated with one or more coating materials prior to being introduced to the matrix, said coating materials being selected to improve wetting between the matrix and the hollow shells and to form barriers to prevent the formation of intermetallics between the hollow shell and the metal matrix, said coating materials including whiskers or fibers, wherein said coating materials and said whiskers or fibers are selected from nickel, copper, titanium, zinc, magnesium, chromium, cadmium, and alloys thereof.

2. The invention of claim 1 in which at least some of the shells are elliptical.

3. The invention of claim 1 in which at least some of the shells are right cylinders.

4. The invention of claim 3 in which the right cylinders have opposing faces selected from a circular, hexagonal, triangular, or rectangular geometric shape.

* * * * *